Sept. 20, 1971  PAT BARILLA  3,606,033
STRUCTURE HANDLING DEVICE
Filed March 24, 1969
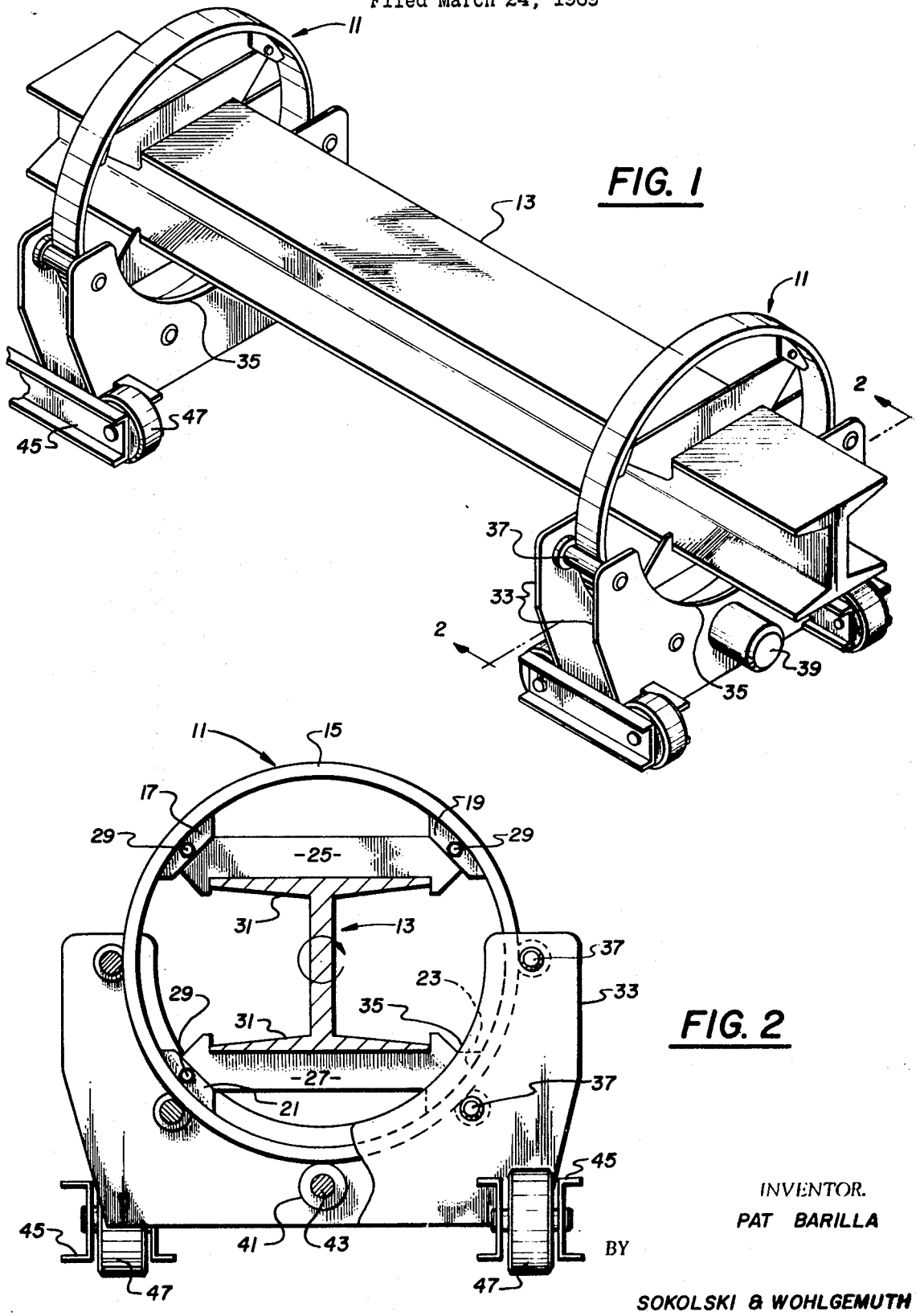
INVENTOR.
PAT BARILLA
BY
SOKOLSKI & WOHLGEMUTH
ATTORNEYS

United States Patent Office 3,606,033
Patented Sept. 20, 1971

3,606,033
STRUCTURE HANDLING DEVICE
Pat Barilla, 6101 Ivory Circle,
Huntington Beach, Calif. 92647
Filed Mar. 24, 1969, Ser. No. 809,803
Int. Cl. B65g 7/00
U.S. Cl. 214—1Q
2 Claims

ABSTRACT OF THE DISCLOSURE

A device for handling structures particularly including steel wide flange beams and the like comprising a ring of diameter substantially larger than the piece to be held with a pair of holding plates detachably connected to the ring and extending inwardly and having a configuration conforming to the piece to be held. Half of the ring rests on a support structure having a plurality of idler rollers in contact with the ring and a frictional drive roller for rotating the ring within the support structure. The support structure is further mounted on wheels which contact the ground so that it can readily be maneuvered when the structure being handled is supported.

---

In the structural steel industry the transportation of large steel wide flange beams has been a problem, particularly the movability of the steel beam, such as turning it about its axis so that it can be welded and worked upon readily. It is an area wherein improvement was sought. Steel beams wide flange, for example, are handled through overhead crane structures since it is difficult to easily maneuver and transport them. Further it is extremely difficult to rotate the beams for any work to be performed. Prior to the herein invention there were several devices for handling items other than wide flange beams, such as, large motor blocks and the like, which did enable one to transport, as well as rotate them. However, these prior art devices were not particularly suitable for utilization with wide flange beams. They were complex, costly and not readily adaptable to the various shaped structures. Thus they did not have the extreme flexibility for items of varying length.

Thus, it is the object of this invention to provide a device for the handling of structures including large steel wide flange beams, bridge girders, roof trusses, tapered steel girders and all structural steel. A further object of this invention is to provide a device which will rotationally support large structures including steel wide flange beams.

Still a further object of this invention is to provide a device which is adaptable to support structures of varying sizes.

One other object of this invention is to provide a device which can be used in aggregate numbers to support large structures.

The above and other objects of this invention are accomplished by the utilization of two or more devices of this invention, which are used to support a structure. Each device is comprised of a solid metal ring. Disposed on the inner periphery of the ring are two pairs of brackets. Each pair of brackets secures a detachable holding plate. The holding plates are of a heavy steel construction and serve to grip the structure to be held and maneuvered. The brackets, together with the holding plates, are disposed and constructed so that the structure to be held is centered within the ring. In the utilization of the device, the ring together with the holding members, are first placed on the item to be held. Then the ring is lowered onto its own support structure.

The support structure for the ring is comprised of two plates spaced one from another a distance greater than the width of the ring and separated from each other by a plurality of idler rollers. The idler rollers are disposed such as to conform to the outer periphery of the ring so that when the ring is placed between the two plates it will rest on them. Additionally disposed between the two plates is a drive rubber wheel which frictionally engages the outer periphery of the ring and will rotate it upon command from an attached motor. A pair of rollers are disposed on each outer side with the two plates of the structure so that the entire structure can be a support structure together with the ring can be easily maneuvered. Presently the rollers are mounted on steel channels extending from and between the plates so as to add stability to the structure and prevent it from tipping over. It is believed the invention will be better understood from the following detailed description and drawings in which:

FIG. 1 is a perspective view of two of the devices of this invention supporting a steel wide flange beam.

FIG. 2 is a partially sectioned view of the device taken along lines 2—2 of FIG. 1.

Turning now to the figures, there is seen the device 11 of this invention. In FIG. 1 two such devices 11 are shown supporting a wide flange beam 13. The device 11 comprises an outer ring 15 of heavy steel or aluminum construction. Affixed to the inner periphery of the ring 15 are a first pair of mounting brackets 17 and 19 respectively and a second such pair of mounting brackets 21 and 23. The brackets can be either integrally formed with the ring 15 if the ring is cast or could be welded thereto. The pairs of brackets serve to hold detachable mounting plates 25 and 27. Bolts 29 serve to secure the mounting plates to their respective support brackets in a detachable manner.

It is preferable as shown in FIG. 2 that the distance between the brackets in each pair be equal to each other. In other words, the distance between brackets 17 and 19 is equivalent to the distance between brackets 21 and 23. Further it is preferable that the distance between corresponding brackets of each pair is equal such that the plates 25 and 27 will be parallel to each other when affixed to the brackets. This arrangement thus enables the precise centering of the structure being held. For example, the steel wide flange beam 13 can thus be held such that its center point C corresponds to the center of the ring structure 11 and that all of the weight contributed by the wide flange beam, the brackets and the mounting plates is equally distributed about the center point C.

In the particular example shown, the plates 25 and 27 are cut out equivalent to the width of the cross portions of 31 that is the flange of the steel wide flange beam structure so as to grip the beam preventing any lateral movement thereof. The beam can be supported by an overhead crane structure while a first ring is hand-guided over the steel beam so that the plates 25 and 27 properly grip the structure as shown. Once two such rings are placed on the steel wide flange beam, the overhead crane is no longer needed and the remaining ones can be readily affixed by merely sliding them down the length of the beam.

The support structure for the ring 15 comprises two identical parallel plates 33. The plates are cut or punched to have a curvature 35 corresponding almost to the periphery of the ring 15. Disposed about the curved portion 35 are a plurality of idler rollers 37 which serve to separate the two plates one from the other while further providing support for the ring 15 which rests thereupon. As shown in FIG. 2, there can be, for example, four idler rollers utilized. It is preferable that there be two idler rollers corresponding to a line extending through the center point C of the structure being held. This serves to center the ring relative to the support structure plates 33 and associated equipment to prevent any imbalance occurring that could possibly tip the device over. The idler rollers will preferably be of a polished steel or the like to provide low friction or resistance upon rotation of the ring. At least one of the devices utilized to support the ring should contain a drive motor 39 to selectively rotate a rubber roller 41 in frictional contact with the ring member 15. This will obviously achieve desired rotation of the entire wide flange beam other part being held when the motor is actuated to turn the drive roller 41 through drive shaft 43. Generally only one unit containing a motor with a drive roller 41 will be required to turn the wide flange beam or other structures. However, it can be appreciated when an extremely long structure is utilized, the requirement of two such units at either end of the item might be necessary.

On either side of the support structure plates 33 are welded steel channels 45. On the outer extremity of the steel channels are disposed rollers 47 which provide means for rolling the structure being held by the devices 11, as well as facilitating movement of the devices 11 relative to the structures 13 being supported. The steel channels 45, which are merely shown by way of example, provide not only means to hold the rollers 47 but more important, give stability to the support structure and prevent it from tipping over should imbalance occur. Any structure is contemplated that will parallel the ground or extending outwardly on either side of the plates away from the ring so as to provide the above mentioned function of adding stability in the event that the ring would tend to tip over.

In view of the foregoing description it can be seen that the devices 11 of this invention offer an extreme degree of flexibility for material handling of various structures by the readily achieved changing of the plates 25 and 27. Thus, structures of several various configurations can be adequately supported with the diameter of the ring 15 being the only material limitation. Further, as many individual units 11 can be utilized, as required, to adequately support any length of structure with two, for example, being shown in FIG. 1.

I claim:
1. A device for handling structures comprising:
a ring,
two pairs of mounting brackets disposed on the inner periphery of said ring,
a separate support plate detachably and rigidly secured to each pair of brackets, said support plates being formed to hold the wide flange beam structure handled in the center of the ring,
means for rotatably supporting said ring about a portion of its outer periphery.
2. A device for handling structures comprising:
a ring,
two pairs of mounting brackets disposed on the inner periphery of said ring,
a separate support plate detachably and rigidly secured to each pair of brackets,
means for rotatably supporting said ring about a portion of its outer periphery comprising a pair of spaced vertical plates, idler rollers disposed between said plates, said rollers on a line equivalent to one half the outer perimeter of said ring,
means extending outwardly from and perpendicular to the bottom portion of said spaced plates to prevent said device from tipping over,
and rollers attached to said extension means for moving said device.

References Cited

UNITED STATES PATENTS

| | | | |
|---|---|---|---|
| 1,907,189 | 5/1933 | Seaman | 214—312 |
| 2,277,310 | 3/1942 | Engelhart | 214—1(R)X |
| 763,307 | 6/1904 | Mills | 214—1(R7)X |
| 2,320,079 | 5/1943 | Hartwig | 214—1(R7) |
| 2,523,880 | 9/1950 | Schoenfielder | 214—1(R7) |
| 2,671,956 | 3/1954 | Krietemeyer | 214—1(R) |
| 2,774,487 | 12/1956 | Rounsefell et al. | 214—1(R) |
| 3,181,709 | 5/1965 | Kinnicutt, Jr. et al. | 214—1(R7) |

FOREIGN PATENTS

| | | | |
|---|---|---|---|
| 515,172 | 11/1952 | Belgium | 214—1(R7) |
| 1,143,561 | 4/1957 | France | 214—1(R) |
| 654,025 | 5/1951 | Great Britain | 214—1(R) |

GERALD M. FORLENZA, Primary Examiner

F. E. WERNER, Assistant Examiner